(No Model.) 2 Sheets—Sheet 1.
E. WESTON.
ELECTRICAL MEASURING INSTRUMENT.
No. 600,983. Patented Mar. 22, 1898.
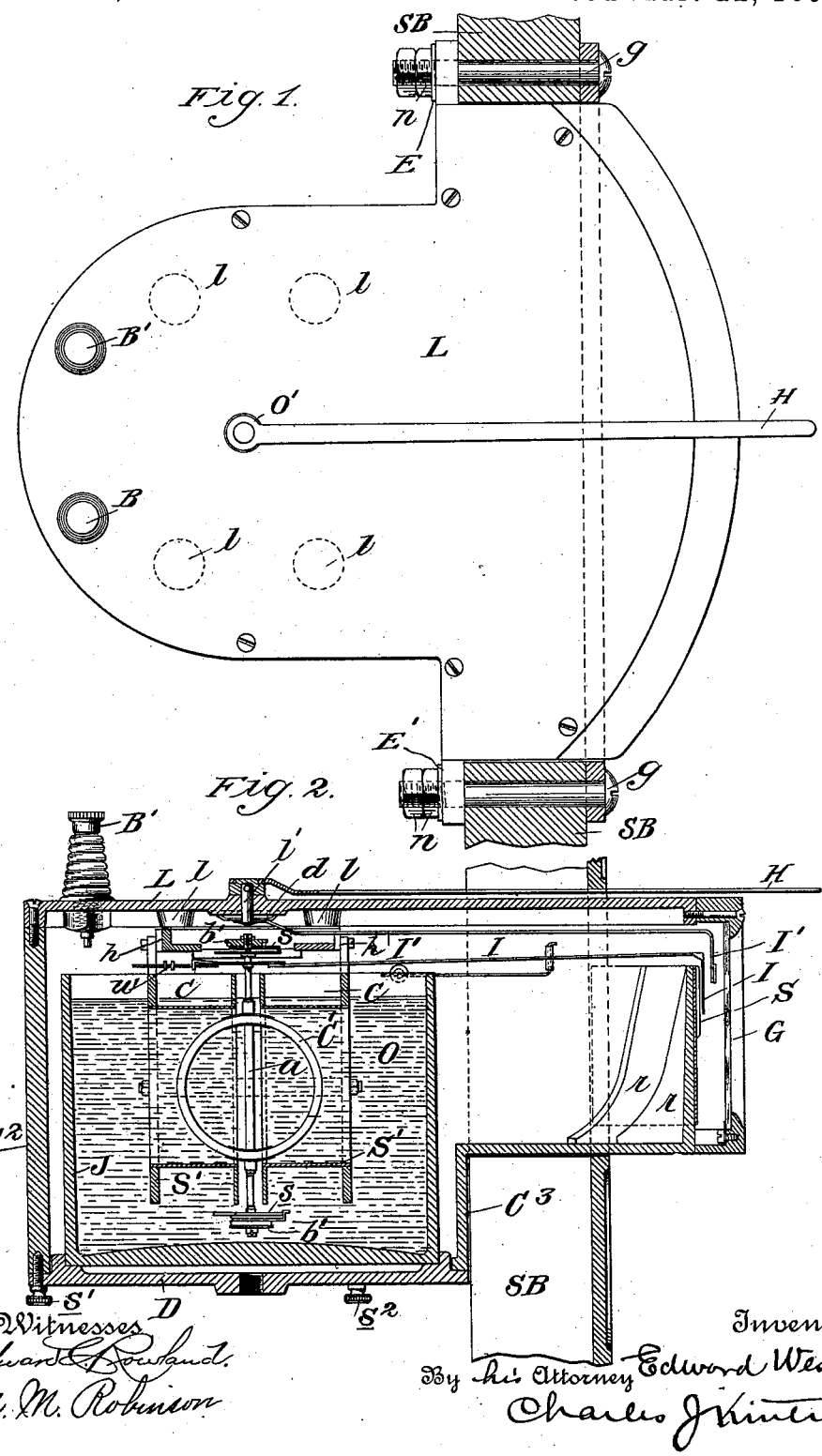

(No Model.) 2 Sheets—Sheet 2.

E. WESTON.
ELECTRICAL MEASURING INSTRUMENT.

No. 600,983. Patented Mar. 22, 1898.

Witnesses
Edward L. Rowland.
M. M. Robinson.

Inventor
Edward Weston
By his Attorney
Charles J. Kintner

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 600,983, dated March 22, 1898.

Application filed December 7, 1897. Serial No. 661,100. (No model.)

*To all whom it may concern:*

Be it known that I, EDWARD WESTON, a subject of Her Majesty the Queen of Great Britain, residing at Newark, in the county of Essex and State of New Jersey, have made a new and useful Invention in Electrical Measuring Instruments, of which the following is a specification.

My invention relates to electrical measuring instruments designed chiefly for use in connection with the measurement of alternating currents of electricity—such, for instance, as is fully disclosed in Reissue Letters Patent No. 11,250, granted to me June 28, 1892; and its objects are, first, to provide a supporting spool or spools for the fixed or energizing coil or coils and means for securing the same, together with the movable coil, the attached indicating-needle, and the binding-posts of the instrument, to the lid of the inclosing casing in such manner that all of the parts may be removed bodily therefrom; second, to provide an instrument of the character indicated with an inclosed movable index-needle adapted to be actuated by hand through the agency of an exposed exterior operating mechanism, such as a handle or knob, the arrangement being such that the mechanically-actuated indicating-needle may be moved to any determinate point upon the scale to which reference is desired with relation to the indicating-needle controlled in its movements by the movable parts of the measuring instrument.

My invention will be fully understood by referring to the accompanying drawings, in which—

Figure 3:
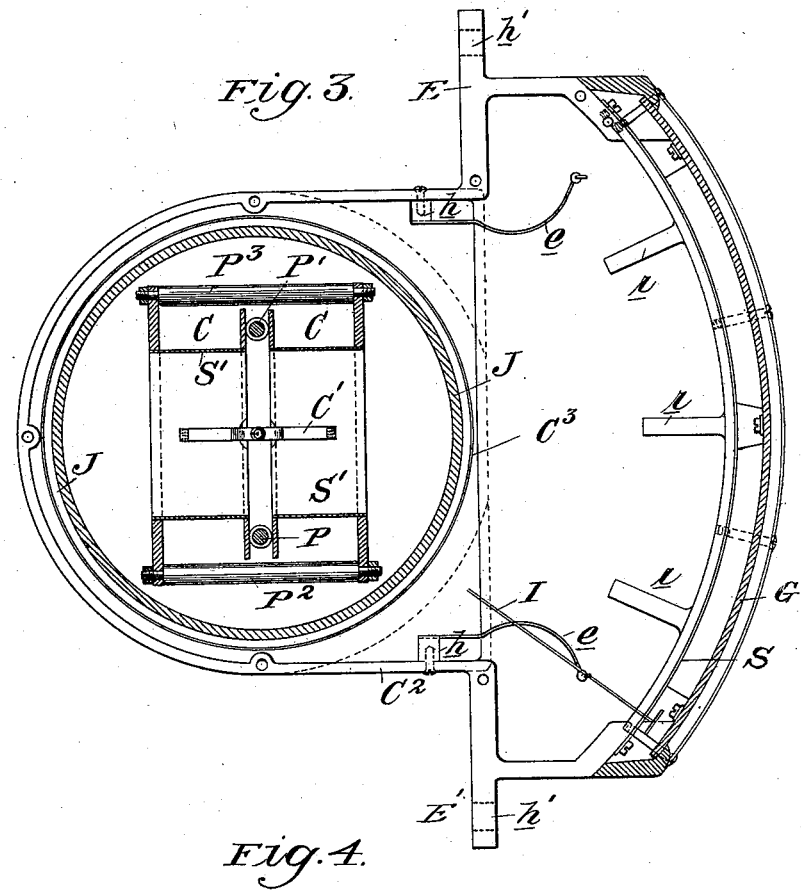
Figure 4:
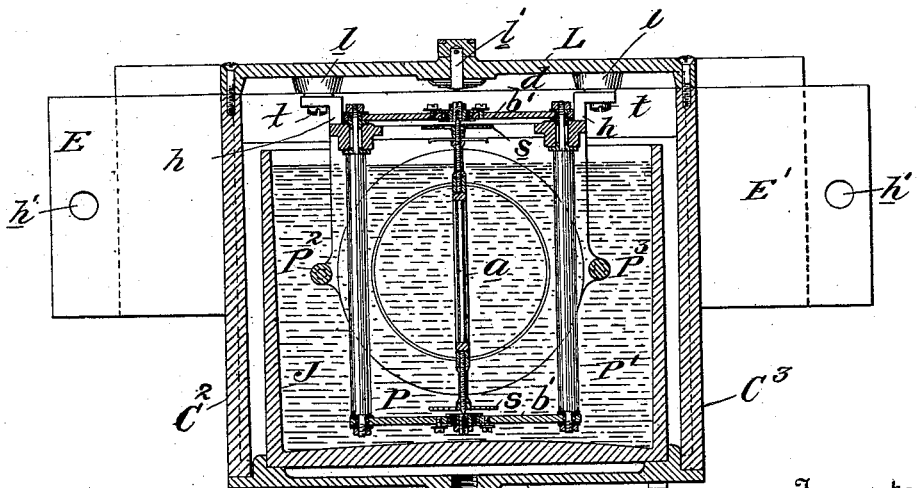

Figure 1 is a plan view thereof, illustrating the apparatus as attached to a switchboard, together with an operating-handle for controlling the movements of the mechanically-actuated index-needle. Fig. 2 is a vertical sectional view taken through the body of the instrument and the sustained spool or spools which support the stationary or energizing coils, (not shown,) the movable coil, its axis, its pivot-points, the indicating-needle carried by the axis, and one of the binding-posts, together with the mechanically-actuated indicating-needle and its extraneous or exposed operating-handle, being shown in side elevational view. Fig. 3 is a transverse sectional view taken through the body of the instrument, illustrating the means of sustaining the spools which carry the energizing-coils, (not shown,) and a sectional view of the movable coil, the indicating-needle being shown in plan view at its zero-point. Fig. 4 is a vertical sectional view taken through the body of the instrument, the hangers and posts which support the instrument, one end of the sustained spool or spools which support the stationary coils, and the means of attaching the parts securely to the under side of the removable lid or cover of the inclosing casing, together with the pivot-support of the mechanically-actuated knob or handle, being all shown in elevational view.

Referring now to the drawings in detail for a clear and full understanding of my invention, $C^2$ represents the retaining-casing, preferably made of cast-iron or equivalent metal and of the conformation shown in plan view in Fig. 1, having lugs or ears E E' and bolt-holes $h'$ $h'$ for securing the instrument to a switchboard S B through the agency of bolts $g$ $g$ and nuts $n$ $n$, $C^3$ being a downwardly-extending cylindrical part of the retaining-casing, as clearly shown in Figs. 2 and 3.

L is the lid, secured to the top of the casing by screws, and D a disk-shaped bottom detachably secured to the bottom of the case by thumb-screws $s'$ $s^2$ $s'$ $s^2$, the upper surface of said disk being provided with a groove for the purpose of securing in position within the casing a glass or equivalent liquid-containing jar or vessel J, containing a substantially non-viscous oil or equivalent liquid retarding medium O.

G is a curved glass or other transparent plate extending entirely across the front of the instrument and secured to the casing by a supporting-frame and screws, as clearly shown in Figs. 2 and 3.

S is the scale, attached to the front face of an upwardly-extending curved portion cast integral with the body part of the inclosing casing, $r$ $r$ being stiffening or strengthening knees therefor.

Cast integral with the lid L are four downwardly-extending lugs $l$ $l$ $l$ $l$, from which is suspended by screws $t$ $t$ and hangers $h$ $h$ a frame which supports two insulating-spools S' S', on which is wound the stationary energizing-coil C, (not shown,) P² P³ being cross bars or rods which secure the opposite sides of the frame and spool-heads together.

$b'$ $b'$ are bridges electrically insulated from but attached at their opposite ends to downwardly-extending posts P P', secured also to the hangers $h$ $h$, acting as abutting supports for the inner ends of the spools S' S', said bridges supporting in turn the vertical shaft $a$ of a movable coil C', the shaft being provided with pivotal supports and oppositely-disposed conducting retractile springs $s$ $s$, the circuit connections through the stationary energizing coil or coils, the pivot-bearings, the retractile springs $s$ $s$, and the movable coil to the binding-posts B B' being obvious in view of my prior patent above referred to.

I is the indicating-needle, connected to the upper end of the shaft $a$ and in such manner that when the coil C' vibrates back and forth under the influence of the stationary energizing-coil it will vibrate with said vibratory coil.

$w$ are weights for counterbalancing the needle I.

$e$ $e$ are buffer-springs located at opposite sides of the instrument and secured to the casing thereof by screws extending inward through lugs $h$ $h$, the function of these parts being to prevent any damaging influence to the light indicating-needle I should it be thrown violently in either direction.

I' is a second indicating-needle, the free end of which is bent downward at right angles and in such manner as to extend beyond the downwardly-extending portion of the indicating-needle I, said needle I' being pivotally supported in alinement with the shaft $a$ by a pivot-pin $l'$, extending upward through the lid L and connected in turn to an operating-handle H, located in the same vertical plane, said operating-handle extending, preferably, to an accessible point beyond the scale-face of the instrument, as clearly shown in Fig. 2.

$d$ is a spring located between the needle I' and the lower face of the lid, said spring being adapted to give sufficient frictional bearing to the parts to cause the needle to remain in any position where it may be moved by or through the agency of the handle H.

In a prior patent, No. 531,669, granted to me on the 1st day of January, 1895, I have described and claimed an indicating apparatus having two indicating-needles, one of which may be temporarily moved by hand to a determinate point upon the scale and the other of which is controlled by the movable part of the instrument itself. This part of my invention is directed to an improvement upon the aforesaid invention to the extent that all of the operative parts are wholly inclosed within a casing and the mechanically-actuated needle is controlled by an extraneous source, as a thumb-knob or by a handle H, the object being to maintain all of the parts of the instrument in a substantially hermetically-sealed casing, so as to be free from dust, grit, and the like.

I make no claim in the present application, broadly, to an electrical measuring instrument in which the instrument itself is secured to a detachable lid, as this feature constitutes in part the subject-matter of claims embraced in another application filed of even date herewith and bearing Serial No. 661,099. My claims in the present application, in so far as they refer to this particular feature, are directed to means for sustaining a spool or spools, which means in turn sustain the spool and its surrounding coil and also the movable coil, the generic claims being embraced in the before-mentioned application; nor do I make any claim in the present application to the use of a liquid retarding medium in which the movable parts of an electrical measuring instrument are immersed, nor to a vessel detachably secured within a casing and containing such a retarding medium, as these features are claimed in the before-mentioned application. Although the features of my invention hereinbefore described and hereinafter claimed are directed to improvements upon the especial type of instrument disclosed in my prior reissue patent, No. 11,250, above referred to, it is to be understood that many of the details of my invention hereinbefore described and hereinafter claimed are applicable to other electrical measuring instruments and that the structure of the instrument itself may be varied to suit the uses to which it is to be put and still come within the scope of my claims. To illustrate, while the present invention, as hereinbefore disclosed, is directed to an improvement in voltmeters for measuring the potential of electrical currents, it is obvious to those skilled in the art that the structure might be varied to meet the requirements of a wattmeter or ampere-meter and still come within the scope of my claims hereinafter made.

Having thus described my invention, what I claim, and desire to secure by Letters Patent of the United States, is—

1. An electrical measuring instrument having its stationary energizing-coil wound upon a spool supported by hangers beneath the detachable lid of the inclosing casing, in combination with a movable coil pivotally sustained within the magnetic field of said stationary coil and an index needle or hand carried by the axis of said movable coil, substantially as described.

2. An electrical measuring instrument having its stationary energizing-coil wound upon two spools, in combination with a movable coil pivotally supported within the magnetic field between the adjacent ends of said spools and an index-hand carried by the shaft of said movable coil, all of said parts being supported or suspended beneath the lid of the inclosing casing, substantially as described.

3. An electrical measuring instrument having its fixed or energizing coil wound upon two spools, in combination with a movable coil pivotally supported in the magnetic field between the adjacent ends of said spools and supporting an index-needle, together with conductors connecting said coils with binding-posts, all of said parts being secured to the detachable lid of the inclosing casing, substantially as described.

4. An electrical measuring instrument provided with two index or indicating needles and a scale wholly inclosed within the casing of the instrument, one of said needles being operatively connected with the movable part of the instrument and the other with extraneous means for mechanically moving it to various positions, substantially as described.

5. An electrical measuring instrument provided with two index or indicating needles wholly inclosed within the casing of the instrument, one of said needles being operatively connected with a rotary coil located within the magnetic field of a stationary coil supported by the lid of the instrument, the other needle being pivotally supported above the first-named needle and provided with extraneous means as a lever for moving it, in combination with an indicating-scale common to both needles, substantially as described.

6. An electrical measuring instrument provided with two coils, one of which is stationary and the other movable, the latter operatively connected with an index or indicating needle or hand, in combination with a second indicating-needle and a scale common to both needles, all of said parts being sustained by the lid of the inclosing casing and the second needle pivotally supported and provided with an operating-lever on the outside of the casing, substantially as described.

7. An electrical measuring instrument wholly inclosed within a casing provided with means for attaching it to a switchboard, the operative parts of said instrument consisting of a stationary and a movable energizing-coil and a movable index-hand carried by the movable coil, in combination with a second movable index-hand and a scale common to both hands, together with extraneous means as a lever operatively connected with the second hand and extending forward through the switchboard to a point accessible to the attendant, substantially as described and shown.

In testimony whereof I have hereunto subscribed my name this 2d day of December, 1897.

EDWARD WESTON.

Witnesses:
C. J. KINTNER,
JOHN C. YOUNG.